United States Patent
Shi

(10) Patent No.: US 9,374,177 B2
(45) Date of Patent: Jun. 21, 2016

(54) METHOD, DEVICE, AND SYSTEM FOR PROCESSING COMMUNICATIONS SYSTEM SIGNAL

(71) Applicant: HUAWEI TECHNOLOGIES CO., LTD., Shenzhen (CN)

(72) Inventor: Xiaoyan Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 14/200,955

(22) Filed: Mar. 7, 2014

(65) Prior Publication Data

US 2014/0187277 A1   Jul. 3, 2014

Related U.S. Application Data

(63) Continuation of application No. PCT/CN2011/079510, filed on Sep. 9, 2011.

(51) Int. Cl.
| | |
|---|---|
| *H04B 1/10* | (2006.01) |
| *H04B 15/06* | (2006.01) |
| *H04B 15/02* | (2006.01) |
| *H04W 88/06* | (2009.01) |

(52) U.S. Cl.
CPC .............. *H04B 15/06* (2013.01); *H04B 15/02* (2013.01); *H04B 1/1036* (2013.01); *H04B 2001/1063* (2013.01); *H04W 88/06* (2013.01)

(58) Field of Classification Search
CPC ............... H04W 88/06; H04B 1/1036; H04B 2001/1045; H04B 2001/1063; H04B 2001/1072
USPC .................. 455/132, 296, 306, 307, 339, 340
See application file for complete search history.

(56) References Cited

U.S. PATENT DOCUMENTS

| 6,047,171 | A | 4/2000 | Khayrallah et al. |
| 6,928,266 | B1 * | 8/2005 | Nevo et al. .................. 455/63.3 |
| 8,600,331 | B2 * | 12/2013 | Kravets ......................... 455/307 |
| 8,774,335 | B2 * | 7/2014 | Abdelmonem et al. ...... 375/350 |

(Continued)

FOREIGN PATENT DOCUMENTS

| CN | 1288609 | 3/2001 |
| CN | 101145833 | 3/2008 |
| CN | 101395807 | 3/2009 |

OTHER PUBLICATIONS

PCT International Search Report and Written Opinion of the International Searching Authority dated Jun. 14, 2012 in corresponding International Patent Application No. PCT/CN2011/079510.

*Primary Examiner* — Duc M Nguyen
(74) *Attorney, Agent, or Firm* — Staas & Halsey LLP

(57) ABSTRACT

The present invention provides a method, a device, and a system for processing a communications system signal. The method includes: acquiring, by a communications system of a first standard, a first message, where the first message carries a signal strength, sent by a communications system of a second standard, on a frequency where interference of the communications system of the second standard on the communications system of the first standard exists; and performing, by the communications system of the first standard, according to the signal strength, filtering processing for a signal to be processed of the communications system of the first standard. In embodiments of the present invention, interference can be reduced and receiving performance can be improved.

5 Claims, 4 Drawing Sheets

(56) References Cited

U.S. PATENT DOCUMENTS

| | | | |
|---|---|---|---|
| 8,989,235 B2 * | 3/2015 | Abdelmonem et al. | 375/148 |
| 2005/0164665 A1 * | 7/2005 | Suganuma | 455/278.1 |
| 2006/0109939 A1 | 5/2006 | Ciccarelli et al. | |
| 2008/0069275 A1 | 3/2008 | Horiguchi et al. | |
| 2009/0017756 A1 * | 1/2009 | Tsfaty et al. | 455/41.2 |
| 2009/0023404 A1 | 1/2009 | Leinonen et al. | |
| 2012/0034891 A1 * | 2/2012 | Chen et al. | 455/214 |
| 2013/0072209 A1 * | 3/2013 | Haartsen | 455/452.1 |

\* cited by examiner

METHOD, DEVICE, AND SYSTEM FOR PROCESSING COMMUNICATIONS SYSTEM SIGNAL

CROSS-REFERENCE TO RELATED APPLICATIONS

This application is a continuation of International Application No. PCT/CN2011/079510, filed on Sep. 9, 2011, which is hereby incorporated by reference in its entirety.

FIELD OF THE INVENTION

The present invention relates to mobile communications technologies, and in particular to a method, a device, and a system for processing a communications system signal.

BACKGROUND OF THE INVENTION

In a network where different systems coexist, to avoid mutual interference between the different systems, the most ideal situation is to completely separate spectrum resources used by the different systems. However, due to scarcity of spectrum resources and continuously growing network capacity demands, a part of or all spectra among the different systems sometimes have to be shared. Sharing of the spectrum resources brings about interference between the different systems.

A fixed filtering manner may be used to eliminate the interference between the different systems. For example, uplink interference of a shared spectrum is eliminated by reducing a bandwidth of a receiving filter. However, if the interference is small, reducing the bandwidth will undoubtedly cause a great loss of uplink performance.

SUMMARY OF THE INVENTION

Embodiments of the present invention provide a method, a device, and a system for processing a communications system signal to improve uplink receiving performance.

In one aspect, the present invention provides a method for processing a communications system signal, including: acquiring, by a communications system of a first standard, a first message, where the first message carries a signal strength, sent by a communications system of a second standard, on a frequency where interference of the communications system of the second standard on the communications system of the first standard exists; and performing, by the communications system of the first standard, according to the signal strength, filtering processing for a signal to be processed of the communications system of the first standard.

In another aspect, the present invention provides a method for processing a communications system signal, including: detecting, by a communications system of a second standard, a signal strength on a frequency where interference of the communications system of the second standard on a communications system of a first standard exists; and carrying, by the communications system of the second standard, the signal strength in a first message and sending the first message to the communications system of the first standard, so that the communications system of the first standard performs filtering processing, according to the signal strength, for a signal to be processed of the communications system of the first standard.

In still another aspect, the present invention provides a device for processing a communications system signal, where the device is located in a communications system of a first standard. The device includes: a receiving unit, configured to acquire a first message, where the first message carries a signal strength, sent by a communications system of a second standard, on a frequency where interference of the communications system of the second standard on the communications system of the first standard exists; and a filtering unit, configured to perform filtering processing, according to the signal strength, for a signal to be processed of the communications system of the first standard.

In still another aspect, the present invention provides a device for processing a communications system signal, where the device is located in a communications system of a second standard. The device includes: a detection unit, configured to detect a signal strength on a frequency where interference of the communications system of the second standard on a communications system of a first standard exists; and a sending unit, configured to carry the signal strength in a first message and send the first message to the communications system of the first standard, so that the communications system of the first standard performs filtering processing, according to the signal strength, for a signal to be processed of the communications system of the first standard.

In still another aspect, the present invention provides a system, including the foregoing two devices.

As can be seen from the foregoing technical solutions, in the embodiments of the present invention, a communications system of a second standard detects a signal strength on a frequency where interference on a communications system of a first standard exists and sends the signal strength to the communications system of the first standard, and the communications system of the first standard performs filtering according to the signal strength, thereby avoiding the problem of a serious uplink performance loss caused by always using a low-pass filtering with a relatively small bandwidth. An optimal filtering manner may be selected according to actual conditions to implement optimal filtering and improve system receiving performance.

BRIEF DESCRIPTION OF THE DRAWINGS

To describe the technical solutions in the embodiments of the present invention more clearly, the following briefly introduces the accompanying drawings for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the present invention more comprehensible, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
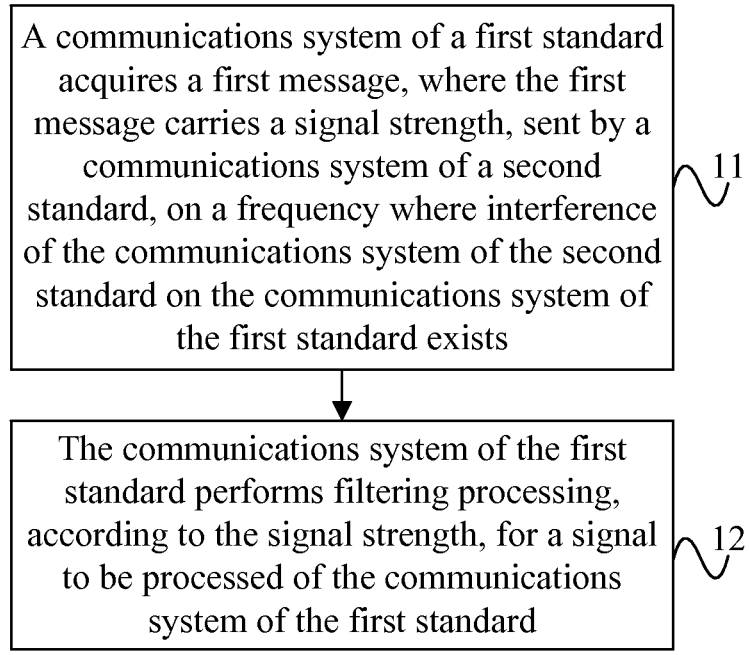
FIG. 1 is a schematic flowchart of a method according to a first embodiment of the present invention.

FIG. 1 is a schematic flowchart of a method according to a first embodiment of the present invention, including:

Step 11: A communications system of a first standard acquires a first message, where the first message carries a signal strength, sent by a communications system of a second standard, on a frequency where interference of the communications system of the second standard on the communications system of the first standard exists.

The communications system of the first standard may be a universal mobile telecommunications system (Universal Mobile Telecommunications System, UMTS), and the communications system of the second standard may be a global system for mobile communications (Global System for Mobile communications, GSM). Certainly, the communications system of the first standard and the communications system of the second standard may also be other systems of radio access technologies. For example, the communications system of the first standard is another radio system that has a large bandwidth, while the communications system of the second standard is another radio system that has a small bandwidth. Specifically, the communications system of the first standard is a 3G system (for example, a UMTS system), and the communications system of the second standard is a 4G system (for example, an LTE-A system).

In addition, the frequency where interference exists can be determined by using the following manners:

1) Determine, according to information such as frequencies and bandwidths configured by a carrier for different systems, frequencies where interference occurs. For example, when the carrier configures the frequencies and bandwidths occupied by the different systems, the communications system of the first standard and the communications system of the second standard learn a configuration manner of the other party, so as to determine whether the other party will be interfered. For example, frequencies used by the communications system of the second standard include a frequency 1, a frequency 2, a frequency 3, and the like, a frequency used by the communications system of the first standard is a frequency 4, and a bandwidth of the communications system of the first standard is B. If the frequency 3 is in the range from a frequency 4−B/2 to a frequency 4+B/2, the frequency 3 is a frequency where interference on the communications system of the first standard exists.

2) Perform calculation and determination according to a rule such as frequency hopping. When one of the two communications systems is a GSM system, it can be understood that, when a service is initiated on the GSM, the system assigns an initial frequency for the service. A frame number and a frequency that are subsequently used by the service may be calculated according to a frequency hopping rule and the initial frequency. Because the frame number and frequency that are used by the service can be calculated, a frequency where interference of the service on the communications system of the other standard occurs can be determined.

After determining a frequency where interference exists, the communications system of the first standard may detect a signal on the frequency where interference exists and obtain a signal strength. Specifically, the signal may be a signal, for which band-pass filtering and local oscillation processing are performed, on the frequency where interference exists. It can be understood that, in a common communications system, band-pass filtering, local oscillation processing, low-pass filtering, and demodulation are successively performed for an air interface signal received by a radio frequency module. In this embodiment of the present invention, the signal strength may be detected in a low-pass filtering process. After low-pass filtering, a signal value after low-pass filtering and a corresponding signal strength are output.

Step 12: The communications system of the first standard performs filtering processing, according to the signal strength, for a signal to be processed of the communications system of the first standard.

The signal to be processed of the communications system of the first standard may specifically be a signal for which band-pass filtering and local oscillation processing are performed of the communications system of the first standard.

In a filtering process, it may be that, when the signal strength is high, a band-stop filter with a relatively large bandwidth is used to perform filtering; when the signal strength is low, a low-pass filter with a relatively large bandwidth is used to perform filtering; when the signal strength is an intermediate value, a low-pass filter with a relatively small bandwidth is used to perform filtering.

A low signal strength indicates corresponding low interference. Therefore, if a low-pass filter with a relatively small bandwidth is used, a relatively large receiving performance loss may be brought about. When the interference is low, a low-pass filter with a relatively large bandwidth may be selected to obtain better receiving performance. When the signal strength is high, the corresponding interference is high. In this case, a band-stop filter can be used to obtain better interference reduction or elimination performance than that of a low-pass filter. Therefore, a band-stop filter is used when the signal strength is high. When the signal strength is intermediate, by comprehensively considering interference reduction performance and receiving performance, a low-pass filter with a relatively small bandwidth may be selected.

The signal strength may be determined to be high, low, or an intermediate value by using a manner of setting a threshold. The relatively large bandwidth may be determined according to a bandwidth of the communications system of the second standard, for example, a value that is roughly the same as a value of the bandwidth of the communications system of the second standard is selected; while the relatively small bandwidth may be selected as a value that is less than the value of the bandwidth of the communications system of the second standard.

In this embodiment, a communications system of a first standard acquires a signal strength, sent by a communications system of a second standard, on a frequency where interference on the communications system of the first standard exists and performs filtering according to the signal strength. A corresponding filtering manner may be selected according to the signal strength, instead of using a fixed filtering manner, thereby avoiding the problem of a serious uplink performance loss caused by always using a low-pass filtering with a relatively small bandwidth. A corresponding optimal filtering manner may be selected according to actual conditions to implement optimal filtering and improve system receiving performance.

Figure 2:
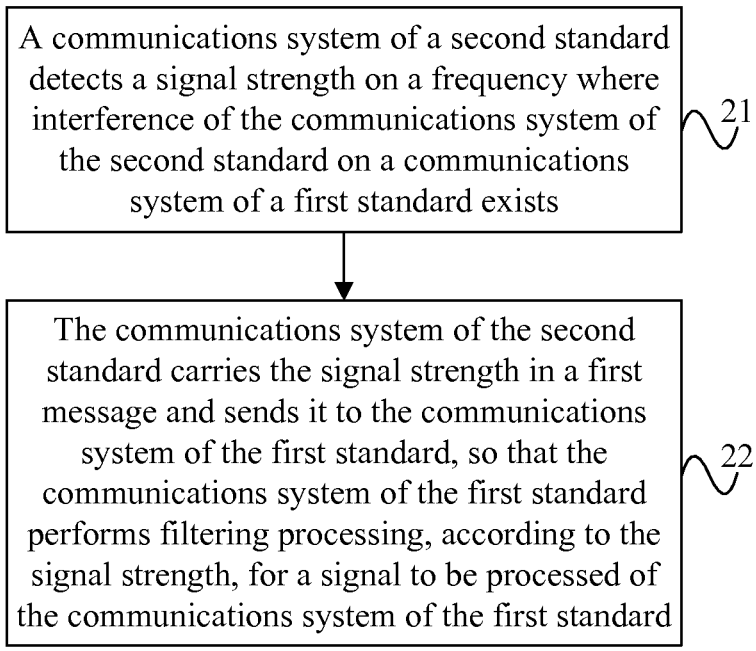
FIG. 2 is a schematic flowchart of a method according to a second embodiment of the present invention.

FIG. 2 is a schematic flowchart of a method according to a second embodiment of the present invention, including:

Step 21: A communications system of a second standard detects a signal strength on a frequency where interference of the communications system of the second standard on a communications system of a first standard exists.

For example, the communications system of the second standard is a GSM system, and the communications system of the first standard is a UMTS.

It may be that, after performing band-pass filtering and local oscillation processing for a signal received by an air interface, the GSM system detects the signal strength on the frequency with interference, where a central frequency of the band-pass filtering is the frequency with interference.

A bandwidth of the band-pass filtering and a bandwidth of low-pass filtering may be 200 kHz.

Step 22: The communications system of the second standard carries the signal strength in a first message and sends it to the communications system of the first standard, so that the communications system of the first standard performs filtering processing, according to the signal strength, for a signal to be processed of the communications system of the first standard.

The signal to be processed of the communications system of the first standard may specifically be a signal for which band-pass filtering and local oscillation processing are performed of the communications system of the first standard.

For a specific principle for the communications system of the first standard to perform filtering according to the signal strength, reference may be made to a description in the first embodiment.

In this embodiment, a GSM system detects a signal strength on a frequency where interference on a UMTS system exists and sends it to the UMTS system, so that the UMTS system performs filtering according to the signal strength. A corresponding filtering manner may be selected according to the signal strength, instead of using a fixed filtering manner, thereby avoiding the problem of a serious uplink performance loss caused by always using a low-pass filtering with a relatively small bandwidth. A corresponding optimal filtering manner may be selected according to actual conditions to implement optimal filtering and improve system receiving performance.

Figure 3:
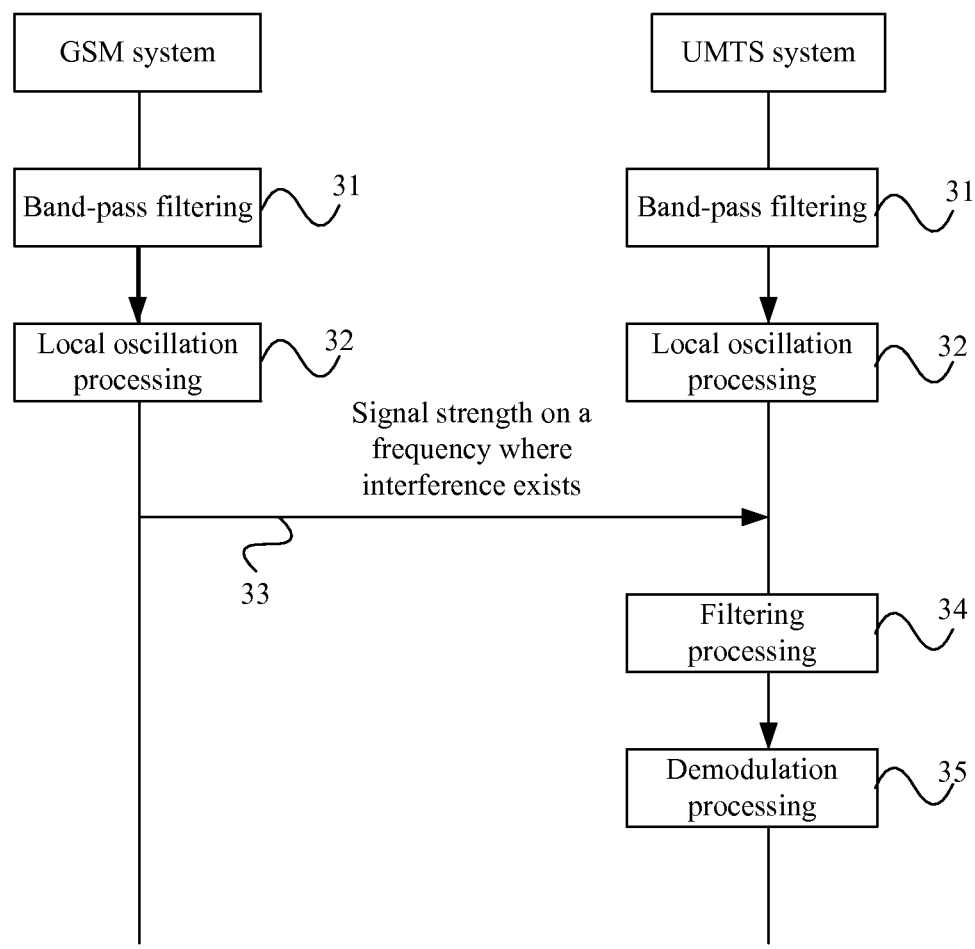
FIG. 3 is a schematic flowchart of a method according to a third embodiment of the present invention.
Figure 4:
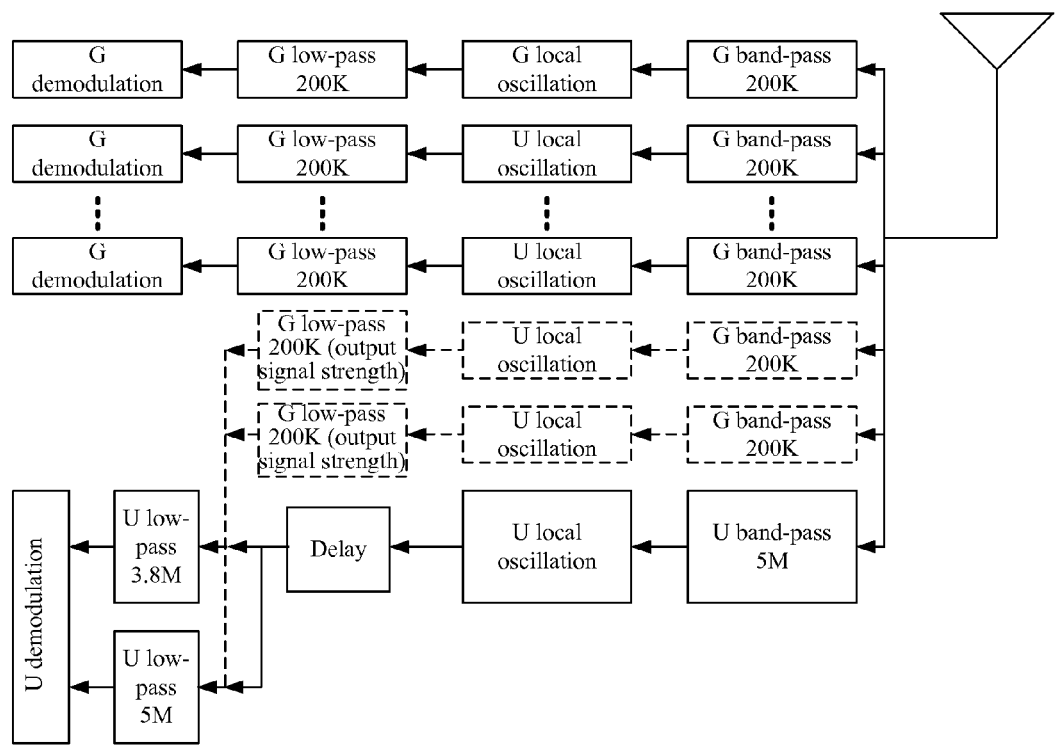
FIG. 4 is a schematic structural diagram of a system corresponding to the third embodiment of the present invention.
Figure 5:
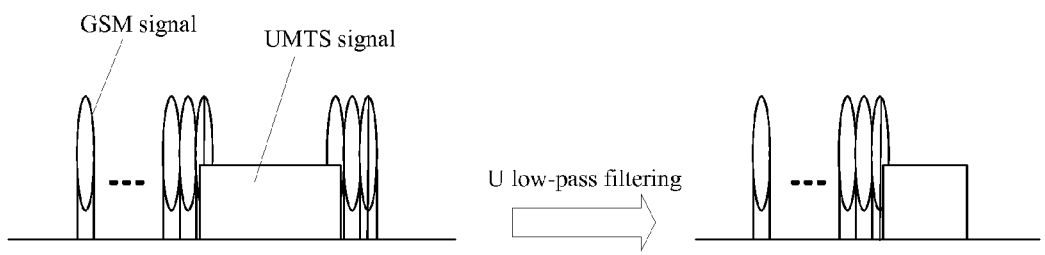
FIG. 5 is a schematic diagram of signals corresponding to the third embodiment of the present invention.
Figure 5:
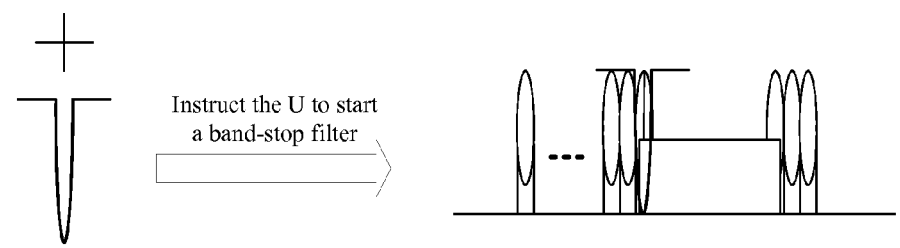

FIG. 3 is a schematic flowchart of a method according to a third embodiment of the present invention. FIG. 4 is a schematic structural diagram of a system corresponding to the third embodiment of the present invention. FIG. 5 is a schematic diagram of signals corresponding to the third embodiment of the present invention.

As shown in FIG. 3, this embodiment includes:

Step 31: A GSM system and a UMTS system perform band-pass filtering for a signal received by an air interface.

In this embodiment, a process implemented by the GSM system may specifically be a process implemented by a GSM intermediate frequency module in a dual-mode base station. The GSM intermediate frequency module includes a first band-pass filter, where a central frequency of the first band-pass filter and a frequency used by the GSM system are in one-to-one correspondence. A bandwidth of each first band-pass filter may be 200 kHz, as shown by G band-pass 200 k shown in FIG. 4.

In this embodiment, a process implemented by the UMTS system may specifically be a process implemented by a UMTS intermediate frequency module in a dual-mode base station. The UMTS intermediate frequency module includes a second band-pass filter, where a central frequency of the second band-pass filter and a frequency used by the UMTS system are in one-to-one correspondence. A bandwidth of each second band-pass filter may be 5 MHz, as shown by U band-pass 5M shown in FIG. 4.

Step 32: The GSM system and the UMTS system perform local oscillation processing for the signal for which band-pass filtering is performed.

For example, a local oscillation module is used. As shown in FIG. 4, G local oscillation and U local oscillation are used to perform local oscillation processing.

It should be noted that frequencies corresponding to the GSM system in band-pass filtering and local oscillation processing include a frequency that does not interferes with the UMTS, indicated by a solid line in FIG. 4, and also include a frequency where interference on the UMTS exists, indicated by a dashed line in FIG. 4.

In addition, after band-pass filtering and local oscillation processing, signals shown on the upper left part of FIG. 5 may be obtained. Among the signals, a GSM signal and a UMTS signal overlap, indicating that interference exists between the two systems.

Step 33: The GSM system performs low-pass filtering for the signal for which band-pass filtering and local oscillation processing are performed, and detects a signal strength on the frequency where interference on the UMTS system exists and sends it to the UMTS system.

After low-pass filtering, demodulation may be performed for a frequency where no interference exists, as shown by G low-pass 200 k and G demodulation indicated by solid lines in FIG. 4.

For a frequency where interference exists, the signal strength needs to be detected again in low-pass filtering and output together with a signal value after low-pass filtering, where the signal strength such as an output signal strength indicated by a dashed line in FIG. 4 is output and sent to the UMTS system.

Step 34: According to the signal strength sent by the GSM system, the UMTS system performs filtering processing for the signal, received by the UMTS system at the air interface, for which band-pass filtering and local oscillation processing are performed.

Specifically, following the principle illustrated in the first embodiment, when the signal strength is greater than a first threshold, a band-stop filter with a first bandwidth is used to perform filtering processing for a signal to be processed of a communications system of a first standard; or when the signal strength is less than or equal to the first threshold and greater than a second threshold, a low-pass filter with a second bandwidth is used to perform filtering processing for the signal to be processed of the communications system of the first standard; or when the signal strength is less than or equal to the second threshold, a low-pass filter with the first bandwidth is used to perform filtering processing for the signal to be processed of the communications system of the first standard.

The first threshold and the second threshold are preset values, and the first threshold is greater than the second threshold.

Further, specific values of the first threshold and the second threshold in a specific system condition may be determined according to test and simulation results.

The first bandwidth may be determined according to a corresponding system bandwidth. For example, the first bandwidth is selected as a value that is roughly the same as a value of the bandwidth of the communications system of the second standard; the second bandwidth may be selected as a value that is less than the value of the first bandwidth.

For example, when the communications system of the second standard in this embodiment is a UMTS system, the first bandwidth may be 5 MHz, and the second bandwidth may be 3.8 MHz.

Specifically, if the signal strength is high, for example, greater than the set first threshold, the UMTS system may use a 5 MHz low-pass band-stop filter such as U low-pass 5M shown in FIG. 4 to perform filtering. In this case, the signal for which filtering is performed may be shown on the lower part of FIG. 5.

If the signal strength is intermediate, for example, less than or equal to the first threshold but greater than the second threshold, the UMTS system may use conventional 3.8M filtering, namely, low-pass 3.8M filtering, such as U low-pass 3.8M shown in FIG. 4. In this case, the signal for which filtering is performed may be shown on the upper right of FIG. 5.

If the signal strength is low, for example, less than or equal to the second threshold, the UMTS system uses conventional 5M filtering, namely, low-pass 5M filtering, such as U low-pass 5M shown in FIG. 4.

It should be noted that though FIG. 4 shows only U low-pass 5M, the U low-pass 5M may be used for low-pass 5M filtering when the signal strength is lowest and may also be used for band-stop filtering when the signal strength is highest. That is, the U low-pass 5M filtering may internally and specifically be divided into two parts. One part is used for low-pass filtering, and the other part is used for band-stop filtering. The band-stop filtering may prevent a signal with a 200 kHz bandwidth, with a frequency where interference exists as a center, in a low-pass 5 MHz bandwidth from passing through.

Specifically, a switch unit may be set in the UMTS system, and a control signal of the switch unit is a signal strength output by the GSM system. If the signal strength is greater than the first threshold, a band-stop filter is connected; if the signal strength is between the first threshold and the second threshold, a low-pass 3.8M filter is connected; if the signal strength is less than the second threshold, a low-pass 5M filter is connected.

Step 35: The UMTS system performs demodulation processing such as U demodulation shown in FIG. 4 for the signal for which filtering is performed. The foregoing provides a process for the UMTS system to eliminate interference of the GSM system. It can be understood that, the same principle may also be used to implement that the GSM system eliminates interference of the UMTS system.

In this embodiment, a GSM system detects a signal strength on a frequency where interference on a UMTS system exists, and the UMTS system performs filtering according to the signal strength. A corresponding filtering manner may be selected according to the signal strength, instead of using a fixed filtering manner, thereby avoiding the problem of a serious uplink performance loss caused by always using a low-pass filtering with a relatively small bandwidth. A corresponding optimal filtering manner may be selected according to actual conditions to implement optimal filtering and improve system receiving performance.

Figure 6:
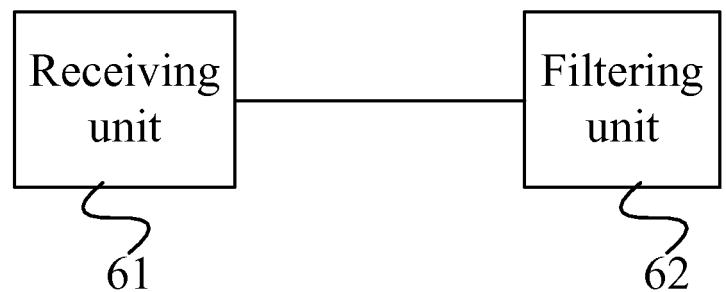
FIG. 6 is a schematic structural diagram of a device according to a fourth embodiment of the present invention.

FIG. 6 is a schematic structural diagram of a device according to a fourth embodiment of the present invention, where the device is located in a communications system of a first standard. The device includes a receiving unit 61 and a filtering unit 62. The receiving unit 61 is configured to acquire a first message, where the first message carries a signal strength, sent by a communications system of a second standard, on a frequency where interference of the communications system of the second standard on the communications system of the first standard exists; and the filtering unit 62 is configured to perform filtering processing, according to the signal strength, for a signal to be processed of the communications system of the first standard.

In an embodiment, the filtering unit is specifically configured to: when the signal strength is greater than a first threshold, use a band-stop filter with a first bandwidth to perform filtering processing for the signal to be processed of the communications system of the first standard; or when the signal strength is less than or equal to the first threshold and greater than a second threshold, use a low-pass filter with a second bandwidth to perform filtering processing for the signal to be processed of the communications system of the first standard; or when the signal strength is less than or equal to the second threshold, use a low-pass filter with the first bandwidth to perform filtering processing for the signal to be processed of the communications system of the first standard; where the first threshold and the second threshold are set values, and the first threshold is greater than the second threshold.

In an embodiment, the device may specifically be an intermediate frequency module of the communications system of the first standard.

In an embodiment, the first bandwidth is 5M, and the second bandwidth is 3.8M.

In an embodiment, the communications system of the first standard is a UMTS system, and the communications system of the second standard is a GSM system.

In an embodiment, after performing band-pass filtering and local oscillation processing for a signal received by an air interface, the communications system of the first standard obtains the signal to be processed. A bandwidth of the band-pass filtering may be 5 MHz.

In this embodiment, a communications system of a first standard receives a signal strength, sent by a communications system of a second standard, on a frequency where interference on the communications system of the first standard exists and performs filtering according to the signal strength. A corresponding filtering manner may be selected according to the signal strength, instead of using a fixed filtering manner, thereby avoiding the problem of a serious uplink performance loss caused by always using a low-pass filtering with a relatively small bandwidth. A corresponding optimal filtering manner may be selected according to actual conditions to implement optimal filtering and improve system receiving performance.

Figure 7:
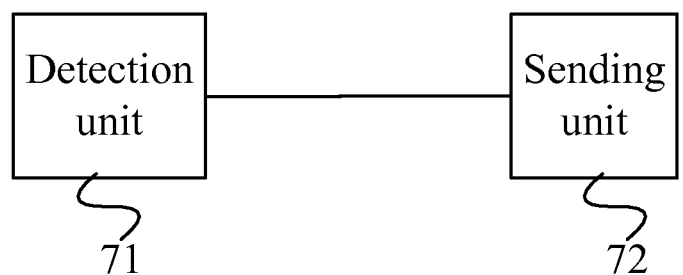
FIG. 7 is a schematic structural diagram of a device according to a fifth embodiment of the present invention.

FIG. 7 is a schematic structural diagram of a device according to a fifth embodiment of the present invention, where the device is located in a communications system of a second standard. The device includes a detection unit 71 and a sending unit 72. The detection unit 71 is configured to detect a signal strength on a frequency where interference of the communications system of the second standard on a communications system of a first standard exists; and the sending unit 72 is configured to carry the signal strength in a first message and send it to the communications system of the first standard, so that the communications system of the first standard performs filtering processing, according to the signal strength, for a signal to be processed of the communications system of the first standard.

In an embodiment, detecting a signal strength may specifically be detecting a signal strength on a frequency with interference after performing band-pass filtering and local oscillation processing for a signal received by an air interface, where a central frequency of the band-pass filtering is the frequency with interference.

In an embodiment, the communications system of the first standard is a UMTS system, the communications system of the second standard is a GSM system, and a bandwidth of the band-pass filtering and a bandwidth of low-pass filtering are 200 kHz.

In an embodiment, the device may specifically be an intermediate frequency module of the communications system of the second standard.

In this embodiment, a communications system of a second standard detects a signal strength on a frequency where interference on a communications system of a first standard exists and sends it to the communications system of the first standard, so that the communications system of the first standard performs filtering according to the signal strength. A corresponding filtering manner may be selected according to the signal strength, instead of using a fixed filtering manner, thereby avoiding the problem of a serious uplink performance loss caused by always using a low-pass filtering with a relatively small bandwidth. A corresponding optimal filtering manner may be selected according to actual conditions to implement optimal filtering and improve system receiving performance.

Figure 8:
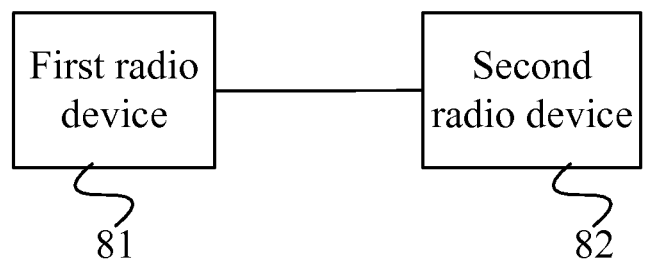
FIG. 8 is a schematic structural diagram of a system according to a sixth embodiment of the present invention.

FIG. 8 is a schematic structural diagram of a system according to a sixth embodiment of the present invention, including a first radio device 81 and a second radio device 82. The first radio device may be the device shown in FIG. 6, and the second radio device may be the device shown in FIG. 7.

In this embodiment, a communications system of a second standard detects a signal strength on a frequency where interference on a communications system of a first standard exists and sends it to the communications system of the first standard, and the communications system of the first standard performs filtering according to the signal strength. A corresponding filtering manner may be selected according to the signal strength, instead of using a fixed filtering manner, thereby avoiding the problem of a serious uplink performance loss caused by always using a low-pass filtering with a relatively small bandwidth. A corresponding optimal filtering manner may be selected according to actual conditions to implement optimal filtering and improve system receiving performance.

It can be understood that, the foregoing device may specifically be a device that implements the foregoing method, and cross reference may be made to related features in the foregoing method and device. In addition, "first" and "second" in the foregoing embodiments are used to distinguish embodiments, but do not represent superiority or inferiority of the embodiments.

Persons of ordinary skill in the art may understand that all or part of the steps of the method embodiments may be implemented by a program instructing relevant hardware. The program may be stored in a computer readable storage medium. When the program is run, the steps of the method embodiments are performed. The storage medium may be any medium capable of storing program codes, such as a ROM, a RAM, a magnetic disk, or an optical disk.

Finally, it should be noted that the foregoing embodiments of the present invention are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method comprising:
    acquiring, by a communications system of a first standard, a message sent by a communications system of a second standard to the communications system of the first standard on a frequency where interference of the communications system of the second standard on the communications system of the first standard exists, the message including an indication of signal strength detected by the communications system of the second standard; and
    performing, by the communications system of the first standard, according to the indication of the signal strength included in the acquired message, filtering processing for a signal to be processed of the communications system of the first standard,
    wherein the performing comprises:
        using a band-stop filter with a first bandwidth to perform filtering processing, when the indication of signal strength indicates that the signal strength is greater than a first threshold, for the signal to be processed of the communications system of the first standard; or
        using a low-pass filter with a second bandwidth to perform filtering processing, when the indication of signal strength indicates that the signal strength is less than or equal to the first threshold and greater than a second threshold, for the signal to be processed of the communications system of the first standard; or
        using a low-pass filter with the first bandwidth to perform filtering processing, when the indication of signal strength indicates that the signal strength is less than or equal to the second threshold, for the signal to be processed of the communications system of the first standard; wherein
        the first threshold and the second threshold are preset values, and the first threshold is greater than the second threshold.

2. The method according to claim 1, wherein the signal to be processed of the communications system of the first standard is a signal for which band-pass filtering and local oscillation processing are performed of the communications system of the first standard.

3. The method according to claim 1, wherein the communications system of the first standard is a universal mobile telecommunications system (UMTS), and the communications system of the second standard is a global system for mobile communications (GSM).

4. A device located in a communications system of a first standard, the device comprising:
    an acquiring unit, configured to acquire a message sent by a communications system of a second standard to the communications system of the first standard on a frequency where interference of the communications system of the second standard on the communications system of the first standard exists, the message including an indication of signal strength detected by the communications system of the second standard; and
    a filtering unit, configured to perform filtering processing, according to the indication of the signal strength included in the message acquired by the acquiring unit, for a signal to be processed of the communications system of the first standard,
    wherein the filtering unit is specifically configured to:
        use a band-stop filter with a first bandwidth to perform filtering processing, when the indication of the signal strength indicates that the signal strength is greater than a first threshold, for the signal to be processed of the communications system of the first standard; or
        use a low-pass filter with a second bandwidth to perform filtering processing, when the indication of the signal strength indicates that the signal strength is less than or equal to the first threshold and greater than a second threshold, for the signal to be processed of the communications system of the first standard; or use a low-pass filter with the first bandwidth to perform filtering processing, when the indication of the signal strength indicates that the signal strength is less than or equal to the second threshold, for the signal to be processed of the communications system of the first standard;

wherein the first threshold and the second threshold are set values, and the first threshold is greater than the second threshold.

5. The device according to claim 4, wherein the device is an intermediate frequency module of the communications system of the first standard.

\* \* \* \* \*